United States Patent Office 3,095,531
Patented June 25, 1963

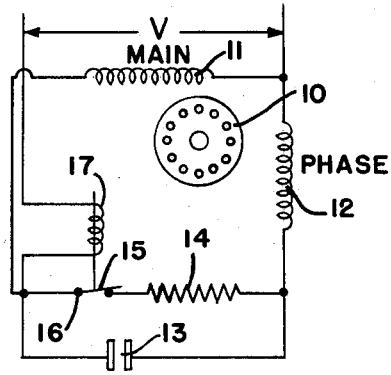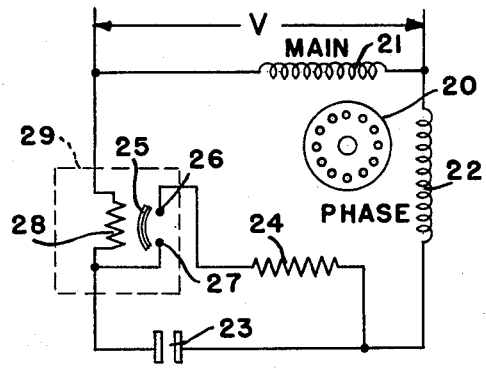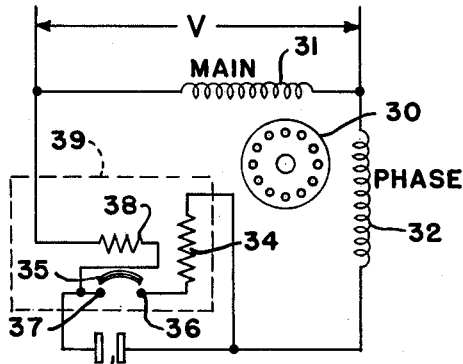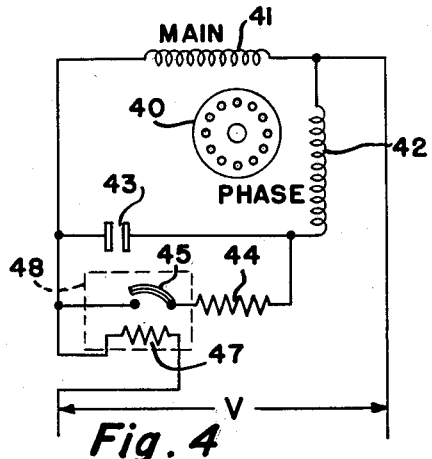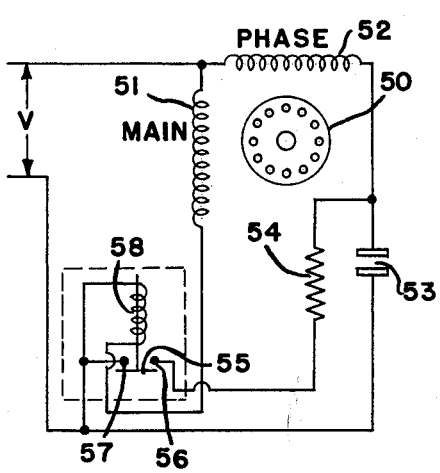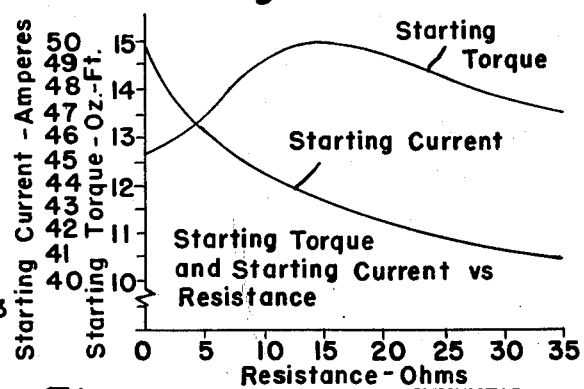

3,095,531
DYNAMOELECTRIC MACHINE BOOSTER
Robert W. Leland, Dayton, Ohio, assignor to General Motors Corporation, Detroit, Mich., a corporation of Delaware
Filed July 25, 1960, Ser. No. 44,938
15 Claims. (Cl. 318—221)

This invention relates to operation of dynamoelectric machines and, particularly, to boost starting thereof economically and decisively.

An object of this invention is to provide a new and improved system to boost starting of dynamoelectric machines economically and effectively by advantageous use of impedance means in a circuit fully favorable during running operation also.

Another object of this invention is to provide booster means for economically increasing starting torque on capacitor-run motors such as used for hermetically sealed compressor units as found, for example, on air conditioners, dehumidifiers and the like.

Another object of this invention is to provide dynamoelectric machine starting boosted by resistance means electrically in parallel connection with capacitance means for optimum starting current conditions and having a switching control impedance in series with both main and phase windings of the dynamoelectric machine such that the resistance means alone is removed from energization during running operation utilizing the same capacitance means.

A further object of this invention is to provide, in combination, a dynamoelectric machine having main and auxiliary winding means physically displaced from each other in quadrature and adapted to be energized to give optimum performance under running conditions with as high a power factor and as low a current drain as possible though otherwise marginal low starting torque is augmented to substantially double value without addition of expensive large capacitor and relay means for starting by provision of resistance means in parallel with unitary capacitance means primarily of relatively low capacity and low cost for use during running yet having the resistance means in predetermined size relationship to winding means resistance such that starting torque is substantially increased while the same capacitance means is maintained in energized condition for running operation subject after starting to switching the resistance means into a dormant condition in response to internal dynamoelectric machine heating due to running load energization.

Another object of this invention is to provide a single phase alternating current motor operating circuit including an inexpensive starting-torque-booster resistance means valued for low wattage rating yet in a range of 150% plus or —10% of the motor winding resistance so as substantially to double starting torque obtainable from a single effective capacitance means energized in series with a starting portion of the motor windings by connecting this booster resistance means in parallel with the same capacitance means during starting operation and maintaining this inexpensive resistance means dormant as to function by switching controlled subject to conditions of running operation.

Further objects and advantages of the present invention will be apparent from the following description, reference being had to the accompanying drawings wherein preferred forms of the invention are clearly shown.

In the drawings:

FIGURE 1 illustrates one circuit for operating a dynamoelectric machine and including resistance means to boost starting torque.

FIGURES 2 and 3 show modifications of the circuit of FIGURE 1 in accordance with the present invention.

FIGURE 4 illustrates another system for a motor operating circuit to include starting-torque-booster resistance means in accordance with the present invention.

FIGURE 5 shows another embodiment of the system of FIGURE 4 in accordance with the present invention.

FIGURE 6 illustrates graphically the variation of starting torque and line current with values of booster resistance means provided for motor operating connections as shown in FIGURE 5, for example. In single phase alternating current motors, it is common and accepted practice to use a pair of windings physically and electrically displaced in phase relationship to each other. The first of such windings is often termed the main or running winding and the other or second thereof is used as a starting or so-called auxiliary winding. These windings are physically displaced from each other in quadrature as to spacing thereof in slots of a magnetic stator core. Depending upon the type of motor in which the windings are used, there is also either a leading or lagging relationship as to current passing through these windings with respect to each other. In most motors of this type, the first or main winding is energized continuously while the second or phase winding is only energized during starting. This is particularly true in resistance start or so-called split phase motors. In such motors, the necessary high resistance is usually a part of the second winding rather than being external to the motor and is achieved by using relatively small diameter wire in the coils making up the windings. This results in a high heating rate and the winding is therefore disconnected by suitable means after the motor has been started.

In capacitor start motors, the same is generally true except for so-called capacitor start-capacitor run motors where the winding is kept energized in series with or through a capacitor during running as well as during starting. In such motors, separate capacitors have been provided to permit starting with a relatively high value of capacitance in one capacitor element and later switching by suitable means to a smaller capacitance during running operation. This achieves good starting characteristics and also has a result of improving maximum or break down torque, the efficiency and the running power factor of the motor.

However, under certain conditions, no change is made in the value of capacitance between starting and running operation. In this special situation, capacitor start-capacitor run motors require no switching means or additional capacitance that would add appreciably to the total cost of a motor installation on air conditioners for example. Such motors are commonly termed permanent split capacitor motors and are used for example in hermetic compressors for air conditioning especially designed to give optimum performance under running conditions with as high a power factor and as low a current drain as possible. This results in very low starting torque. Many motors are in use with common capacitance for both starting and running operation where the compressor loading is such that the low starting torque of the motor can be tolerated. However, it has been found that due to this marginal torque ability and due to variability in compressors of a given design, it is often necessary to add on a starting capacitor and magnetic relay at considerable cost to insure satisfactory starting. Such a remedy is expensive though cheaper than discarding or reworking a completed unit. Features of the present invention provide a more economical method of obtaining additional starting torque without going to the extent of adding a costly starting capacitor and magnetic relay to remake the motor into a capacitor-start-capacitor run type. Features of the present invention also permit replacement of capacitor start-capacitor run motors as well as capacitor start motors in installations where starting requirements for the motors are moderate. Circuitry as herein disclosed provides a more economical method of attaining optimum starting effort from capacitor start-capacitor run motors.

FIGURES 1, 2, 3, 4, and 5 illustrate circuit connections and systems whereby a torque-booster resistance means connected in parallel with capacitance can greatly increase starting torque of a motor. A dynamoelectric machine or motor of FIGURE 1 includes an armature or rotor 10 having a suitable winding such as a cast metal squirrel cage subject to magnetic fields of flux emanating from a first or main winding 11 and second or phase winding 12 adapted to be energized from a suitable source of power providing line voltage V. The first or main winding means 11 is connected directly across the line but the second or phase winding 12 has a unitary capacitance means 13 in series therewith. This capacitance means 13 is used both during starting and running operation and can have a relatively low capacity (in microfarads) and low cost yet be of benefit for attaining relatively high starting torque due to predetermined parallel connection of resistance means 14 in parallel therewith. A parallel or shunt circuit relationship between capacitance means 13 and resistance means 14 is established by closure of a switch arm 15 into engagement with a contact 16 subject to operating conditions effective upon an inexpensive impedance means such as relay coil 17 also in series with the second or phase winding 12 as well as the shunt or parallel circuit including capacitance means 13 and resistance means 14. The impedance or relay coil 17 as connected in the circuit of FIGURE 1 carries the main and the phase current which passes through the second or phase winding 12 as well as the parallel connected resistance means 14 and capacitance means 13. Switch arm 15 is closed in engagement with contact 16 during starting such that resistance means 14 can provide a torque boost with the capacitance means 13 in parallel therewith. In response to change in starting current at a predetermined level, the relay coil 17 effects a break in the circuit closing connection between switch arm 15 and contact between switch arm 15 and contact 16 so as to disconnect the resistance means 14 from parallel relationship with the capacitance means 13 which is used further during running operation. The resistance means 14 is maintained in a dormant condition during running operation of the motor.

FIGURE 2 illustrates a dynamoelectric machine or motor having a rotor 20 as well as a first or main winding means 21 and second or phase winding means 22 energizable from a suitable source of power having a line voltage V. A capacitance means 23 is adapted to have resistance means 24 connected in parallel therewith during starting operation. A thermally deflective arm or bridge 25 is adapted to close an energizing circuit to the resistance means 24 by establishing electrical connection across contacts 26 and 27. A thermal element or heater means 28 in series with the second or phase winding 22 as well as the parallel connected capacitance means 23 and resistance means 24 carries full phase current such that internal phase heating conditions effect a break in the continuity of the electrical connection across contacts 26 and 27. The resistance means 24 remains dormant in function and the capacitance means 23 alone is utilized during capacitor run operation of the dynamoelectric machine. In this embodiment, the resistance means 24 and a thermal relay 29 including the components or parts 25—26—27—28 can be provided at less cost than a larger capacitance means or additional capacitance means and its switching means to be used in parallel with the running capacitance.

FIGURE 3 illustrates a dynamoelectric machine or motor having a rotor 30 as well as a first or main winding 31 and second or phase winding 32. In series with the second or phase winding 32, there is a capacitance means 33 adapted to be used both during starting and running operation. However during starting, a resistance means 34 is connected in parallel with the capacitance means 33 by means of a bridge or arm 35 adapted to interconnect contacts 36 and 37. The contact arm 35 can be a bimetallic material subject to heating by a secondary resistance unit or element 38 of a dual resistance thermal relay 39 incorporating resistance means 34 as well as arm 35 and contacts 36—37 and heater element 38 in a single unit or component as outlined in FIGURE 3. Thus the thermal relay 29 outlined in FIGURE 2 includes only a single heating unit and the arm 25 to bridge contacts 26—27 with respect to a separate resistance means 24 whereas in the embodiment of FIGURE 3, the dual thermal relay 39 provides similar components in a subassembly or cartridge-like torque booster means.

It is to be understood that resistance means 34 has a greater ohmic value than that of the heating unit 38 in the circuit of FIGURE 3. In each of the illustrations of FIGURES 1, 2, and 3, it is apparent that the torque-boosting resistance means 14, 24 and 34 can be connected in parallel with capacitance means 13, 23, and 33 respectively in response to internal motor conditions dependent upon internal motor conditions dependent upon phase current alone. In some instances, it is desirable to break the energizing connection to torque boosting resistance means in response to total current including current supplied summarily for energization of the primary as well as the secondary windings. FIGURE 4 illustrates a dynamo-electric machine or motor having a rotor 40 as well as a first or main winding 41 and a second or phase winding 42. In series with the phase winding, there is a torque-boosting parallel or shunt circuit including both capacitance means 43 as well as resistance means 44 with the latter energized during starting due to normally closed condition of a contact arm 45 in engagement with a contact 46. The arm 45 can be bimetallic subject to heating by a heating element or unit 47 located adjacent to the arm 45 to effect heating thereof and separation therefrom out of electrical engagement with the contact 46. The arm 45, contact 46 and heating element 47 are included as part of a thermal relay 48 outlined in FIGURE 4. It is to be noted that the heating element 47 carries total current supplied to both the first and second windings 41 and 42 respectively both during starting and running operation. Such total current is sufficient during running operation to effectively maintain disconnection of the resistance means 44 for boosting of starting torque only and assure maintainance of dormant conditions as to this resistance means 44 during running operation.

FIGURE 5 illustrates another dynamoelectric machine or motor having a rotor 50 as well as a first or main winding 51 and second or phase winding 52. A capacitance means 53 and resistance means 54 for torque-boosting purposes to be in parallel with each other carry phase current in series with the secondary or phase winding alone as in the embodiment of FIGURE 5 as well as FIGURE 4, in the latter of which as in FIGURE 1 also the impedance means for control of energization of the torque boosting resistance means carries total motor current rather than only phase current alone as in the embodiments of FIGURES 2 and 3. In the embodiment of FIGURE 5 current in the main winding only passes through coil 58 which actuates a switch arm or bridge 55 to establish energization for resistance means 54 only during starting operation by bridging of contacts 56 and 57. Movement of the arm or bridge 55 is in response to energization of a relay coil 58 having a magnetic core or plunger axially shiftable thereby and attached to the arm or bridge 55.

FIGURE 6 is a chart to illustrate variation of starting torque and line current in response to change in value of resistance means such as 54 connected with capacitance means 53 in parallel with each other as noted in FIGURE 5 for example. It is apparent from the chart that increase of this resistance means in parallel with the capacitance means effects a decrease in starting current and that a peak in starting torque obtainable by use of such torque booster resistance means is obtained substantially at a resistance value of 15 ohms. Since there is an optimum angle and magnitude combination of the current vectors in the first and second motor windings for maximum torque and maximum torque-locked line amperes, there is also an optimum value of resistance which produces the torque-boosting effect. The resistance value differs for each motor but has been found to be generally in the area of 150% of winding resistance. A compromise can be made to reduce the starting current by using a value of resistance greater than the optimum so far as a peak in starting torque is concerned yet an appreciable improvement in starting performance is realized due to presence of the torque boosting resistance means. Generally the value of the torque-boosting resistance means will be in the area of 150% of the particular winding resistance though reasonable variation such as at least 10% above and below this 150% value will also serve the torque-boosting purpose. Improved starting performance to a value above the marginal conditions referred to earlier will often suffice rather than actually doubling the starting torque which is possible by selecting specifically the optimum value of resistance. Doubling of starting torque may be more than necessary and thus use of a value of resistance for torque-boosting purposes in accordance with the present invention can be compromised to a value other than that which would necessarily provide the greatest value of starting torque.

Switching means suitable for use in achieving boost in torque by addition of resistance means in parallel with a capacitor means can be potential as well as current-type relays which operate on a change in the second winding voltage or first winding current respectively as the motor accelerates. Previously, expensive starting capacitor means had to be removed from circuit energization before full motor speed is reached. One reason for such deenergization of purely starting capacitance is to prevent the voltage across the starting capacitor from rising to any higher than necessary so as to permit use of a lower voltage rated capacitor than would be possible if full speed were permitted before switching such capacitor out of the circuit. This type of relay has the disadvantage of not removing the capacitor from the circuit if the motor fails to start.

In accordance with the present invention, a relay of the thermal type can be used which will allow the motor to reach full speed before acting to disconnect resistance means but which presents no appreciable disadvantage since the voltage across the resistance means does not rise very rapidly as the motor approaches full speed. The resistance means is relatively insensitive to any such voltage rise effects. In addition, this type of switching means will operate to remove the resistance means from the circuit whether or not the motor remains stalled. Therefore, a very low wattage rated resistance means can be used to enhance the favorable economic aspects of the invention. Physically small size thermal protectors are commercially available and useful for the purposes of the present invention. Recently such a thermal switch or protectors having two heaters or elements have become available and can be used in the circuit of FIGURE 3 for example. Use of resistance means alone for increase of starting torque of a motor will result in undesirable vector relationships so far as maximum power factor is concerned during running operation. Elimination of the resistance means for torque-boost during starting only assures presence of the capacitance means during running operation to off-set reactive power factor due to inductance of motor windings. Increase of starting torque by paralleling a running capacitance means with a torque-boosting resistance means removable by switching operation from the circuit except during a short period when the motor is being started provides the effect of a split-phase start and capacitor run motor but accomplished at appreciably less cost than usual and with the additional advantage of having starting current limited positively in accordance with the present invention.

While the embodiments of the present invention as herein disclosed constitute preferred forms, it is to be understood that other forms can be adopted.

What is claimed is as follows:

1. In combination, a dynamoelectric machine having first and second winding means physically displaced from each other and carrying currents out of phase with each other as effected by capacitance means in series with one of said winding means at all times including both starting and running operation, and torque-booster resistance means switchable into parallel connection with the capacitance means in effect to short out said capacitance means to simulate split-phase starting operation only during starting for positive limit of starting current per se while increasing real starting current vector closer to unity power factor though free of costly additional starting capacitance, said resistance means having a low-wattage rating and resistance value at least over 100% of the resistance value of said winding means of the dynamoelectric machine.

2. In combination, a dynamoelectric machine having first and second winding means physically displaced from each other and carrying currents out of phase with each other as effected by capacitance means in series with one of said winding means, a starting torque-booster resistance means of a resistance value 100% and more of the resistance value of said dynamoelectric machine winding means though energizable electrically in parallel connection with the capacitance means only during starting, and a switching relay means in series with said resistance means to establish energization thereof only during starting operation and operable in response to energizing conditions in one of said winding means.

3. The combination of claim 2 wherein said switching means is a thermal relay having one heating unit therein effective upon bi-metallic contact means to close when cool for energization of said torque-boost resistance means and to open in response to predetermined heating of current carried thereby for deenergization and disconnection of said torque-boost resistance means.

4. The combination of claim 2 wherein said switching means is a thermal relay having built-in dual resistances of differing value, the smaller of which is used as a heater to effect opening and closing of circuit connection to parallel said torque-boost resistance means with said capacitance means and the greater of which is used as said torque-boost resistance means.

5. A motor operating system comprising, first and second winding means physically and electrically out of phase with each other, capacitance means in series with one of said winding means during both starting and running operation, and a starting torque-boost impedance means in a range of between 140% and 160% that of motor winding means both to boost starting torque as well as to limit starting current and connectable in parallel with said capacitance means during starting operation.

6. The system of claim 5 wherein said impedance means is purely resistive and rated for low wattage though said capacitance means used in parallel therewith has primarily a low voltage rating for running operation.

7. A motor operating circuit comprising, first and second winding means physically and electrically displaced from each other, capacitance means in series with one of said winding means during both starting and running operation, a starting torque-boost resistance means to limit starting current connectable in parallel with said capacitance means during starting operation only, and a switching means including an electrical element capable of carrying a total of current supplied to both said first and second winding means as a control for parallel connection of said capacitance means and torque-boost resistance means.

8. The circuit of claim 7 wherein both said winding means and said capacitance means alone provide only marginal starting ability and said torque-boost resistance means augments starting torque with starting current limited.

9. The combination of claim 2 wherein said switching means includes a relay-operating coil in series with one of said winding means and said starting torque-booster resistance means has a resistance value specifically near 150%±10% that of said particular winding means.

10. The combination of claim 2 wherein said switching means includes a bimetallic switch arm in series with said starting torque-booster resistance means as well as a heater resistance in series with said second winding means, said heater resistance having a physical location to convey heat to said bimetallic switch arm and said starting torque-booster resistance means having a resistance value specifically near 150%±10% that of said particular winding means.

11. The combination of claim 2 wherein said switching means includes a relay-operating coil in series with said first winding means and a switch contact arm shiftable in response to coil energization and in series with said starting torque-booster resistance means both to shunt said capacitance means and to limit starting current by having a resistance value generally 150% that of said winding means.

12. The combination of claim 2 wherein said switching means is a thermal relay having built-in dual resistances of differing value, the smaller of which is used as a heater for a bimetallic contact arm to effect opening and closing of circuit connection to parallel said torque-boost resistance means with said capacitance means having primarily a low voltage rating for running operation and the greater of which is used as said torque-boost resistance means having a resistance value generally 150% that of said winding means.

13. The circuit of claim 7 wherein said switching means includes a relay-operating coil that carries said total of current supplied to both said first and second winding means, said coil serving to actuate a switch arm to establish energization of said starting torque-boost resistance means in parallel with said capacitance means during starting operation only.

14. The circuit of claim 7 wherein said switching means is a thermal relay having a resistance heater means that carries said total of current supplied to both said first and second winding means, said resistance heater means serving to actuate a switch arm to establish energization of said starting torque-booster resistance means in parallel with said capacitance means during starting operation only.

15. The combination of claim 2 wherein said torque-boost resistance means is built-in with said switching means.

References Cited in the file of this patent

UNITED STATES PATENTS

| | | |
|---|---|---|
| 1,707,424 | Bailey | Apr. 2, 1929 |
| 2,117,123 | Werner | May 10, 1938 |
| 2,810,104 | Wright | Oct. 15, 1957 |

FOREIGN PATENTS

| | | |
|---|---|---|
| 415,853 | Great Britain | Sept. 6, 1934 |